A. W. WHITCOMB.
METAL PLANER.
APPLICATION FILED JAN. 27, 1913.
1,088,001.
Patented Feb. 24, 1914.
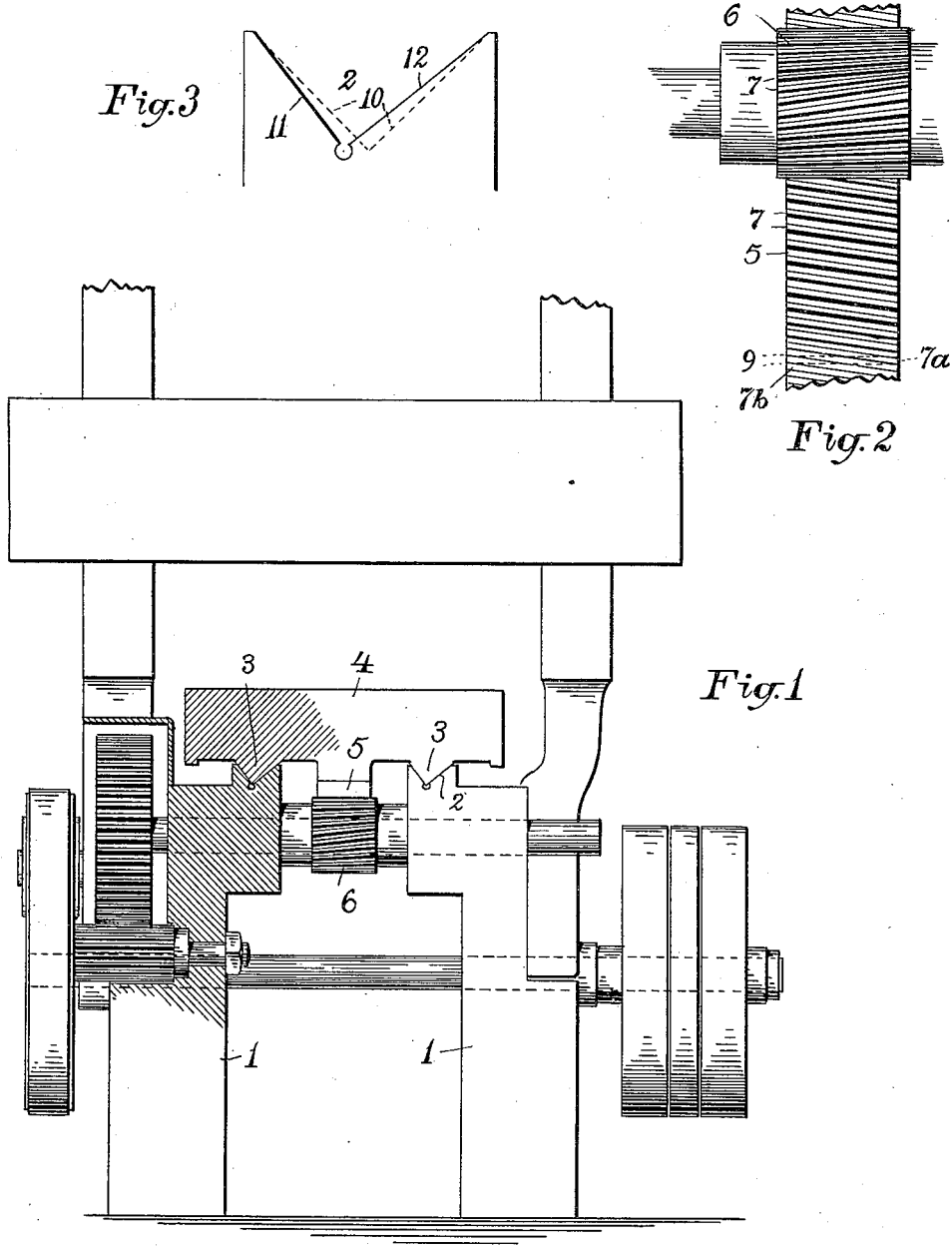
Witnesses,
Edwin Shivell
C. C. Munster
Inventor,
Alonzo W. Whitcomb;
By A. B. Upham.
Attorney.

UNITED STATES PATENT OFFICE.

ALONZO W. WHITCOMB, OF WORCESTER, MASSACHUSETTS.

METAL-PLANER.

1,088,001. Specification of Letters Patent. Patented Feb. 24, 1914.

Application filed January 27, 1913. Serial No. 744,318.

*To all whom it may concern:*

Be it known that I, ALONZO W. WHITCOMB, a citizen of the United States, and a resident of the city and county of Worcester and Commonwealth of Massachusetts, have invented certain new and useful Improvements in Metal-Planers, of which the following is a full and exact description.

This invention relates to machines designed for planing metal, and it has for its object the effecting of means for preventing the slight but visible irregularity usually given to the planed surfaces through the action of the driving gear upon the rack of the planer-table; for I have discovered that in practice, however carefully the teeth of such rack and gear may have been cut, a slight irregularity of motion is usually imparted to the table, which is likely to develop irregularities in the surfaces planed, commonly called chatter-marks. This occurs mainly in planers wherein the teeth of rack and driving gear are of usual type, that is, where they are cut at right angles to the rack and parallel to the axis of the driving gear. In this construction, exceedingly exact contours of teeth, which are very difficult to form and practically impossible to maintain under wear, are required for steady motion of the table, owing to the constant change of the pressure-contact of the teeth over a considerable portion of the teeth-curves. This requirement of exceedingly exact shape of teeth may be avoided to a great extent by the use of a rack having teeth cut obliquely across its face at an angle sufficiently large to make the corresponding pitch-line bearings of each two adjacent teeth cross a single line at right angles to the rack, and of a driving gear having helical teeth of an angle corresponding to that of the rack-teeth. In rack and gear of these forms, exactness in shape of teeth is of much less importance than in ordinary spur-tooth rack and gearing, owing to the practically constant maintenance of pressure-contact of teeth on their pitch lines; and for this reason, the oblique-tooth rack and helical driving-gear, cut with reasonable accuracy, are much more likely to transmit steady motion than rack and gear having ordinary spur teeth cut with equal accuracy.

Another advantage of this construction is a lessened tendency of the driving gear to lift the planer table when heavy cuts are being taken, the pressure angle of the teeth being always that at their pitch-lines, while the pressure angle of the commonly used spur teeth varies from their pitch-line to the much greater angles of their more curved surfaces. With rack having oblique teeth and driving gear having helical teeth, however, there is encountered a difficulty caused by the lateral thrust of the helical gear upon the rack and table. This lateral thrust— though it need not be heavy, since small angles of obliquity of teeth are entirely practicable—is objectionable only because it would be added to the lateral pressure of the cutting tool when that should happen to be in the same direction and thus decrease the power of the planer table to stay solidly in the bed ways and hold its straight-line movement under certain cutting stresses. This difficulty may be avoided in several ways, as for instance, by the use of a double helical gear with helical teeth in two sets of teeth of equal and opposite angles, commonly called herringbone gear, and a rack or racks to match this double gear, or by gibs which positively hold the table from sidewise movement. These methods are objectionable, the one by reason of greater cost of construction of parts, the other by reason both of greater construction cost and of difficulty of maintenance in perfect working condition. I have found, however, that the difficulty presented by the lateral thrust of a helical gear upon a planer table can be wholly avoided in a very simple manner, namely, by making the angle of that side of the bed ways against which the thrust of the helical driving gear is exerted steeper than the angle used where the driving gear exerts no lateral pressure. This steepening of the angle of one side of the ways increases the power of the table to resist sidewise pressure against it, and it is evident that this increase of resisting power can be made to offset any lateral thrust of the driving gear without sacrifice of the desirable capacity of V-shaped tracks and ways to take up their own wear and maintain their proper bearing and alinement. Its own effect of increasing the wedging action of the table tracks in the bed ways can be offset by making the opposite sides of the latter less steep than where spur driving gears are used, because the lateral thrust of the helical driving gear acts away from these opposite sides and aids them in holding the table against sidewise pressure in their direction.

I have found that changes of the angles of inclination from the horizontal of the sides of the ways in small planers from 45° in each, which is common practice, to 50° in the case of the sides toward which the lateral thrust of the helical driving gear is directed, and to 40° in the case of the opposite sides, practically counteracts all tendency of the helical driving gear to disturb the balance of the resisting power of the table against sidewise pressure of the cutting tool, and that only similar slight distortions of the conventional equi-angular planer ways may be made without sacrifice of the valuable qualities of V-shaped ways. Of course, when the planer table is making its return stroke, the sidewise thrust of the helical driving gear is not counteracted by the angularity of the ways, but during this return the cutting tool is not cutting; therefore no sidewise thrust except that of the helical gear acts upon the table, and this of itself can be made very small and not at all liable to affect the tracking of the table.

Referring to the drawings forming part of this specification, Figure 1 is an end elevation of a planer made in accordance with my invention, a part thereof being in section and parts broken away. Fig. 2 is a view from beneath of the driving gear and a portion of the rack. Fig. 3 is an end view of one of the bed grooves.

As shown in Fig. 1, the planer frame 1 is formed with grooved ways 2 receiving the rails 3 of the planter table 4, and motion is communicated to said bed through the agency of the rack 5 and the driving gear 6, the latter receiving its power through any customary means. As illustrated in Fig. 2, the teeth 7 of said rack and gear are cut obliquely, the angle of such obliquity being preferably such that a straight line drawn at right angles across the rack will cut opposite ends of adjacent teeth upon their corresponding pitch lines. For example, the dotted lines 9, which are drawn at right angles to the sides of the rack, cut opposite ends of the two teeth $7^a$ and $7^b$, so that there is never an instant when the teeth of the driving gear are not in driving contact at their pitch line with the teeth of the rack.

In the way the teeth are shown as cut in Fig. 2, the lateral pressure given by the gear to the rack will be toward the left, in the direction of the arrow. Consequently, the groove 2, shown in Fig. 3 on a larger scale than in Fig. 1, which would otherwise be that indicated by the dotted lines 10, has its left-hand surface 11 given an inclination several degrees nearer vertical, and a right hand surface 12 given an inclination an equal number of degrees nearer horizontal, than are said lines 10. In other words, the line bisecting the angle of the V-groove is not vertical but inclined with its upper end toward the right. The rails 3 of the planer table being shaped to fit said grooves, as indicated in Fig. 1, the lateral thrust given to the table by the obliquity of the teeth is fully compensated for by the greater sidewise resistance of the surfaces 11. In practice, I prefer so to proportion the inclination of the grooves' surfaces that the gravitational effect upon the surfaces 12 shall approximate the sum of the gravitational effect upon the surfaces 11 plus the tooth-created lateral pressure against the same.

With the pitch of tooth and width of rack such as is illustrated in Fig. 2, an inclination of five or six degrees from the customary slopes are found to produce the best results; although this depends somewhat upon the angle of the V which is employed. Where the V-grooves are flatter than the usual 90° angle, as is the case with the heavier planers, the inclination of their bisecting lines should be slightly more pronounced.

When the driving gear is returning the planer table for a new stroke, the lateral pressure given to the table by the obliquity of the teeth will be in the opposite direction to that given when the table is moving forward, but the machine is then doing no work and what occurs is of no importance.

What I claim as my invention and for which I desire Letters Patent is as follows, to wit:—

1. The combination with supporting ways and a body movable thereon, of a rack carried by said body, and a gear meshing with and driving said rack, the axis of said gear being substantially at right angles to the longitudinal dimension of said rack and the teeth of said rack and gear being oblique, and said body being provided with means resisting the lateral thrust given to said rack through said obliquity.

2. The combination with ways, of a body slidable thereon, one being formed with rails and the other with grooves, one having a rack and the other a driving gear intermeshing with said rack, said gear having its axis at right angles to the line of advance of said body, the teeth of said rack and gear being oblique, and the angles of the surfaces of said grooves and rails being disposed to resist the lateral thrust caused by said obliquity in greater proportion than needed for resisting opposite lateral pressure.

3. The combination with grooved ways, of a body having rails slidable in said ways, a rack rigid with said body, and a driving gear meshing with said rack, the axis of said gear being substantially at right angles to the longitudinal dimension of said rack and the teeth of said rack and gear being oblique, and said grooves and rails being formed to resist the lateral thrust given to said body through said obliquity.

4. The combination with grooved ways, of a body having rails slidable in said ways, a rack rigid with said body, and a gear meshing with and driving said rack, the axis of said gear being at right angles to the line of advance of said body, and the teeth of said rack and gear being oblique, and the angles of the surfaces composing said grooves being disposed to resist the lateral pressure caused by said obliquity in greater proportion than needed for resisting opposite lateral pressure.

5. The combination with grooved ways, of a body having rails slidable in said ways, a rack rigid with said body, and a gear meshing with and driving said rack, the axis of said gear being at right angles to the line of advance of said body, and the teeth of said rack and gear being oblique, and each of said grooves having two inclined plane surfaces one of which is more nearly vertical than the other, the more nearly vertical surface being designed for resisting the lateral thrust caused by said obliquity.

6. The combination with grooved ways, of a body having rails slidable in said ways, a rack rigid with said body, and a driving gear meshing with said rack, the teeth of said rack and gear being oblique, and each of said grooves having two flat inclined surfaces, a line bisecting the angle of each of said grooves being inclined approximately six degrees from the vertical for the purpose of enabling the more nearly vertical surface to resist the thrust resulting from the obliquity of said teeth.

7. A metal planer comprising grooved ways each having two inclined surfaces composing a V, a plainer table having rails fitting said grooves and slidable therein, a rack rigid with said table, and a driving gear meshing with said rack, the teeth of said rack and gear being oblique to the line of said table's travel the axis of said gear being at right angles to the line of advance of said table, one surface of a groove being more nearly vertical than the other surface for resisting the thrust resulting from said obliquity.

In testimony that I claim the foregoing invention, I have hereunto set my hand this 17th day of January, 1913.

ALONZO W. WHITCOMB.

Witnesses:
 ROBT. J. SHERWOOD,
 WILTON H. CURRIER.